United States Patent Office 3,131,180
Patented Apr. 28, 1964

---

3,131,180
PROCESS FOR THE MANUFACTURE OF HYDROXYPREGNANES AND FUNCTIONAL DERIVATIVES THEREOF
Oskar Jeger and Kurt Schaffner, Zurich, Switzerland, assignors to Ciba Corporation, a corporation of Delaware
No Drawing. Filed Dec. 21, 1960, Ser. No. 77,287
Claims priority, application Switzerland Dec. 23, 1959
7 Claims. (Cl. 260—239.55)

By the process described in U.S. patent application Serial No. 820,595, filed June 15, 1959, by Oskar Jeger, irradiation of 20-oxosteroids yields the corresponding 18:20-cyclo-20-hydroxy derivatives.

The present invention is based on the observation that irradiation of 21-substituted 20-oxopregnane compounds yields, in addition to the corresponding 21-substituted 18:20-cyclo-20-hydroxy-derivatives, also 21-unsubstituted 18:20-oxidopregnane compounds. The course taken by the irradiation reaction can be represented, for example, by the following scheme of partial formulae:

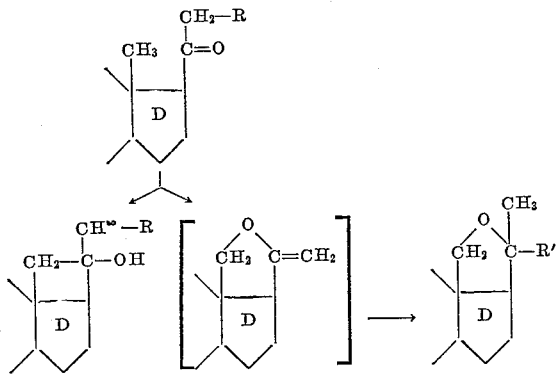

in which R represents an esterified or etherified hydroxyl group or a halogen atom and R' an etherified hydroxyl group. Since the compounds of the second formula type above, viz. 20-ethers of 18:20-oxido-20-hydroxy-pregnane compounds thus formed are converted by mild hydrolysis into the corresponding 18:20-oxido-20-hydroxy-pregnane, viz. 18-hydroxy-20-oxo pregnane compounds, the new process affords a new and simple method of introducing directly a hydroxyl group into the 18 position of a pregnane compound:

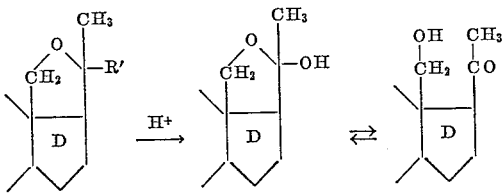

The 18-hydroxy-20-oxo-pregnane compounds are physiologically active hormone-like steroids and also intermediates for the manufacture of other 18-oxygenated physiologically important hormones, such as aldosterone and related compounds. Thus e.g. 18-hydroxy-progesterone has a luteoid activity (U.S. Patent No. 2,891,948, issued June 23, 1959, by Raphael Pappo), but can also be used as intermediates for the preparation of e.g. 9α-fluoro-18-hydroxy-corticosterone-acetate described in U.S. Patent No. 2,917,510, issued December 15, 1959, by Albert Wettstein et al. Such conversion involves introduction of an 11α-hydroxy group, splitting water off the 9:11-position, formation of the 9:11β-epoxide, splitting of this epoxide with hydrofluoric acid and introduction of a 21-hydroxy group according to methods known in the art.

According to the present process a 20-oxopregnane containing in the 21-position an esterified or etherified hydroxyl group or a halogen atom is irradiated, from the reaction mixture the 20-ether of 18:20-oxido-20-hydroxy-pregnane compound formed is isolated and, if desired, treated with a hydrolysing agent.

The irradiation according to the present process is advantageously carried out in a lower aliphatic or alicyclic alcohol, above all ethanol, or methanol, propanol, a butanol or cyclohexanol. Also suitable as solvents are lower aliphatic or cycloaliphatic hydrocarbons, for example, pentane, hexane, cyclohexane, also ethers, for example diethyl ether or dioxane. When an ether, such as diethyl ether, is used as solvent it is possible to isolate the primary product of the reaction, the $\Delta^{20}$-18:20-oxido-pregnene compounds. Suitable sources of light are artificial or strong natural light, preferably ultra-violet light such as is emitted by a high-pressure mercury lamp, or strong sunlight. Normally, the reaction is performed at a temperature ranging from $-10°$ to $+150°$ C., but a higher or lower temperature may also be used, since it has been observed that the temperature employed has less influence on the progress of the reaction than has the solvent used and/or the duration of the irradiation.

The 21-substituted 18:20-cyclo-20-hydroxypregnanes and 21-unsubstituted 18:20-oxidopregnanes containing an etherified 20-hydroxyl group formed simultaneously by the irradiation treatment can be separated by virtue of their different polarity, for example by chromatography, counter-current distribution, crystallization, or advantageously by a combination of these methods of separation.

It is of special advantage to hydrolyse the 20-ethers of 18:20-oxido-20-hydroxy-pregnane compounds obtained by the present process with the use of an acid agent, such as dilute acetic acid, dilute hydrochloric, sulfuric or perchloric acid, or para-toluenesulfonic acid in the presence of a ketone such as acetone.

A product of the present process that contains a free hydroxyl and/or oxo group can be converted by a known method into a functional derivative thereof, such as an ester, ether, enol ester, enol ether, acetal, a corresponding thio derivative, for example a thio ether, thio acetal or ester of a thionic acid, furthermore into a hydrazone or oxime thereof. The acid radicals in the esters and enol esters are those of saturated or unsaturated aliphatic, cycloaliphatic, aromatic or heterocyclic monocarboxylic or dicarboxylic acids, of sulfonic acids, or of phosphoric, sulfuric or hydrohalic acids. The radicals present in the ethers, enol ethers, acetals or the corresponding thio-derivatives may belong to the aliphatic, aromatic or heterocyclic series; such radicals are, for example, alkyl, preferably lower alkyl or alkylene, aralkyl, such as benzyl, di- or triphenylmethyl groups, tetrahydropyranyl groups or sugar radicals, such as those of glucose, galactose or maltose.

The 20-oxopregnane compounds used as starting material are known. They are substituted in the 21-position, for example by an esterified hydroxyl group, such as a formyloxy, acetoxy, propionyloxy, butyryloxy, methanesulfonyloxy, para-toluenesulfonyloxy group, or by an etherified hydroxyl group, such as a methoxy-, ethoxy- or tetra-hydropyranyloxy group, or by a halogen atom such as fluorine, chlorine, bromine or iodine. Apart from those mentioned above, the starting materials may contain other substituents, such as free or functionally converted hydroxyl or oxo groups, halogen atoms, alkyl such as methyl groups, for example in the positions 1, 2, 3, 4, 5, 6, 7, 8, 9, 11, 12, 14, 15, 16, 17 and/or 19. They may be saturated in the ring system (5α- or 5β-series) or they may be unsaturated or contain double bonds, for example starting from carbon atoms 5 and/or 9. The term functionally converted hydroxyl and oxo groups includes esterified or etherified hydroxyl groups and ketalized oxo groups, the acid or alcohol radicals being preferably those mentioned above. Hydroxy compounds, such as 3α-, 3b-, 11α-hydroxy compounds, are advantageously used in the form of their esters, such as acetates, and Δ⁴-3-oxo compounds in the form of their Δ⁵-3-lower alkylenedioxy-ketals, such as Δ⁵-3-ethylenedioxy-ketals.

The resulting 18:20-oxidopregnane compounds containing an etherified hydroxyl group in 20-position, for example the compounds of the following formulae, are new:

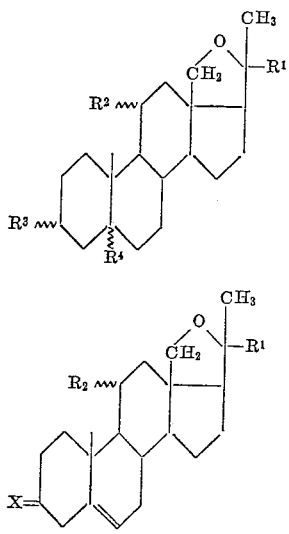

In these formulae R¹ represents a hydroxyl group etherified e.g. with a lower aliphatic or alicyclic alcohol, such as a methoxy, ethoxy, propoxy, butoxy or cyclohexyloxy group; R² and R³ each represents a hydrogen atom or an esterified hydroxyl group, for example an acetoxy group; R⁴ represents a hydrogen atom in the α- or β-position; and X represents the radical of an open-chain or cyclic ketal.

Starting from the 3-ethylene glycol ketal of desoxycorticosterone acetate there is obtained by the present process in a 2-stage operation the 18-hydroxy-progesterone which hitherto has been difficult of access:

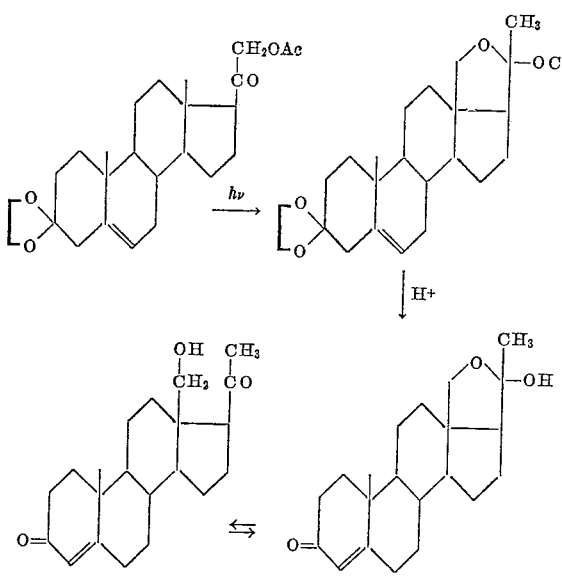

The following examples illustrate the invention:

Example 1

A solution of 1.3 grams of Δ⁵-3:3-ethylenedioxy-20-oxo-21-acetoxypregnene in 1.1 liters of ethanol is irradiated for 4 hours with a high-pressure mercury burner (Biosol burner A, No. 10/27, 250 watt [Philips]). The lamp is arranged centrally in an irradiation vessel made of quartz and is cooled by means of water. The irradiation treatment is performed at room temperature in a current of nitrogen. The solution is evaporated in vacuo and the reaction mixture is separated on a column of neutral alumina (activity II) into 3 oily eluates with petroleum ether+benzene 1:1 (540 mg.), ether (456 mg.) and methanol (150 mg.). The fractions eluted with petroleum ether+benzene are once more chromatographed on 30 times their own weight of alumina (activity II). A 9:1 mixture of petroleum ether and benzene elutes 259 mg. of a product which, after having been recrystallized three times from ether+methanol, forms crystals melting at 187–188° C. Optical rotation $[\alpha]_D = +1°$ (c.=0.45). No bands appear in the infrared absorption spectrum (in chloroform) above 3020 and between 2800 and 1470 cm.⁻¹. The product is the Δ⁵-3:3-ethylenedioxy-18:20-oxido-20ξ-ethoxypregnene.

The ether fractions are likewise chromatographed once more on a column of neutral alumina (activity II); elution with benzene and with a 9:1 mixture of benzene and ether yields an eluate of 207 mg. of a product which melts at 195–196° C. after having been recrystallized three times from acetone+hexane. Optical rotation $[\alpha]_D = -7°$ (c.=0.22). Infrared absorption spectrum in chloroform: bands at 3610, 1738 and 1245 cm.⁻¹. The product is the Δ⁵-18:20-cyclo-3:3-ethylenedioxy-20ξ-hydroxy-21-acetoxypregnene.

For the purpose of the hydrolysis a solution of 75 mg. of Δ⁵-3:3-ethylenedioxy-18:20-oxido-20-ξ-ethoxypregnene in a mixture of 3 cc. of glacial acetic acid, 2.5 cc. of methanol and 0.5 cc. of water is heated for 2 hours at 60° C. and then kept overnight at room temperature. The reaction mixture is taken up in ether, washed with sodium bicarbonate solution and with water, the ethereal solution is dried and evaporated, and the resulting oil (75 mg.) is chromatographed on a column of neutral alumina. Elution with petroleum ether+benzene yields only oily mixtures, whereas with ether 18 mg. of crystals are eluted which melt at 178–180° C. after having been recrystallized twice from acetone+hexane. Optical rotation $[\alpha]_D = +159°$ (c.=0.85). No depression is observed in the mixed melting point test with 18-hydroxyprogesterone.

Example 2

1.3 grams of Δ⁵-3:3-ethylenedioxy-20-oxo-21-acetoxypregnene in 1.3 liters of methanol are irradiated as described in Example 1. The chromatographic purification of the crude product with a 1:1 mixture of petroleum ether and benzene yields 157 mg. of Δ⁵-3:3-ethylenedioxy-18:20-oxido-20ξ-methoxypregnene melting at 187–188° C., while with benzene 154 mg. of Δ⁵-18:20-cyclo-3:3-ethylenedioxy-20ξ-hydroxy-21-acetoxy-pregnene are obtained, which melts at 194–196° C.

Example 3

1.08 grams of Δ⁵-3:3-ethylenedioxy-20-oxo-21-acetoxypregnene in 470 cc. of absolute ether are irradiated under nitrogen for 4 hours at room temperature. By subjecting the crude product to chromatographic purification with a 9:1 mixture of petroleum ether and benzene there are obtained 200 mg. of amorphous Δ⁵·²⁰-3:3-ethylenedioxy-18:20-oxido-pregnadiene.

Example 4

Irradiation of 3β:21-diacetoxy-20-oxo-5α-pregnane as described in Example 2 yields a product which, on treatment with alcoholic potassium carbonate solution, produces 3β-hydroxy-18:20-oxido-20-methoxy-5α-pregnane melting at 174° C.

An analogous treatment of Δ⁵-3:3-ethylenedioxy-20-oxo-21-bromopregnene yields Δ⁵-3:3-ethylenedioxy-18:20-oxido-20-methoxypregnene.

Example 5

1.3 grams of $\Delta^5$-3:3-ethylenedioxy-11$\beta$:21-diacetoxy-20-oxopregnene in 1.1 liters of ethanol are irradiated and worked up as described in Example 1. The reaction mixture can be chromatographically separated into $\Delta^5$-3:3-ethylene-dioxy-11$\beta$-acetoxy-18:20-oxido-20 - ethoxy-pregnene and $\Delta^5$-18:20-cyclo-3:3-ethylenedioxy-11$\beta$:21-diacetoxy-20$\xi$-hydroxypregnene.

When $\Delta^5$-3:3-ethylenedioxy-11$\beta$-acetoxy-18:20-oxido-20-ethoxypregnene is subjected to acid hydrolysis as described in Example 1, the $\Delta^4$-3:20-dioxo-11$\beta$-acetoxy-18-hydroxy-pregnene is formed, which is present as the $\Delta^4$-3-oxo-11$\beta$-acetoxy-18:20-oxido-20-hydroxypregnene.

When $\Delta^5$-3:3-ethylenedioxy-11$\alpha$:21-diacetoxy-20-oxopregnene is irradiated as described above and the reaction mixture is then subjected to chromatographic separation the $\Delta^5$-3:3-ethylenedioxy-11$\alpha$-acetoxy-18:20-oxido - 20-ethoxypregnene is obtianed which can be hydrolysed to yield $\Delta^4$-3:20-dioxo-11$\alpha$-acetoxy-18-hydroxy-20-oxopregnene or $\Delta^4$-3-oxo-11$\alpha$-acetoxy-18:20-oxido-20-hydroxypregnene respectively by treatment with methanolic glacial acetic acid.

What is claimed is:

1. Process for the manufacture of 21-unsubstituted 18:20-oxido-pregnane compounds, wherein a member selected from the group consisting of a saturated and an unsaturated 20-oxo-pregnane compound, which in 21-position contains a member selected from the group consisting of an esterified hydroxyl group, an etherified hydroxyl group and a halogen atom, is irradiated with ultraviolet light in an organic solvent and there is isolated the 21-unsubstituted 18:20-oxido compound.

2. Process as claimed in claim 1, wherein irradiation is carried out in a member selected from the group consisting of an aliphatic and an alicyclic alcohol.

3. A process according to claim 2, wherein a 20-ether of an 18:20-oxido-20-hydroxy-pregnane compound is heated with a hydrolysing agent to obtain the corresponding free 20-hydroxy compound.

4. $\Delta^5$-3-ethylenedioxy - 18:20 - oxido-20$\xi$-ethoxy-pregnene.
5. $\Delta^5$-3-ethylenedioxy-11$\alpha$-acetoxy - 18:20 - oxido-20$\xi$-ethoxy-pregnene.
6. $\Delta^5$-3-ethylenedioxy-11$\beta$-acetoxy - 18:20 - oxido-20$\xi$-ethoxy-pregnene.
7. A member selected from the group consisting of a compound of the formula:

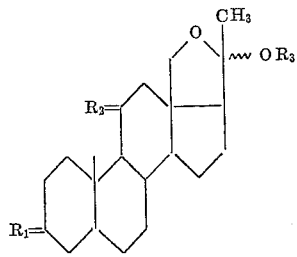

wherein $R_1$ is a lower alkylenedioxy group, $R_2$ a member selected from the group consisting of a hydrogen atom together with an esterified hydroxyl group and two hydrogen atoms and $R_3$ is a lower alkyl group, and its derivatives having a double bond in the 5,6-position.

References Cited in the file of this patent

UNITED STATES PATENTS 2,907,758    Pappo ------------------ Oct. 6, 1959

OTHER REFERENCES

Labler et al.: Chem. and Industry, 1958, pp. 1661–1662.
Labler et al.: Collection of Czechoslovak Chemical Communications 24, 2975–2985 (Sept. 1959).
Labler et al.: Collection of Czechoslovak Chemical Communications 24, 4010–4014 (Dec. 1959).
Labler et al.: Collection of Czechoslovak Chemical Communications 25, 265–270 (Jan. 1960).
Wehrli et al.: Helv. Chim. Acta. 43, 367–371 (1960).